Dec. 12, 1933.   G. W. GRAY ET AL   1,939,392
FRACTIONATING APPARATUS
Original Filed Sept. 13, 1922   2 Sheets-Sheet 1
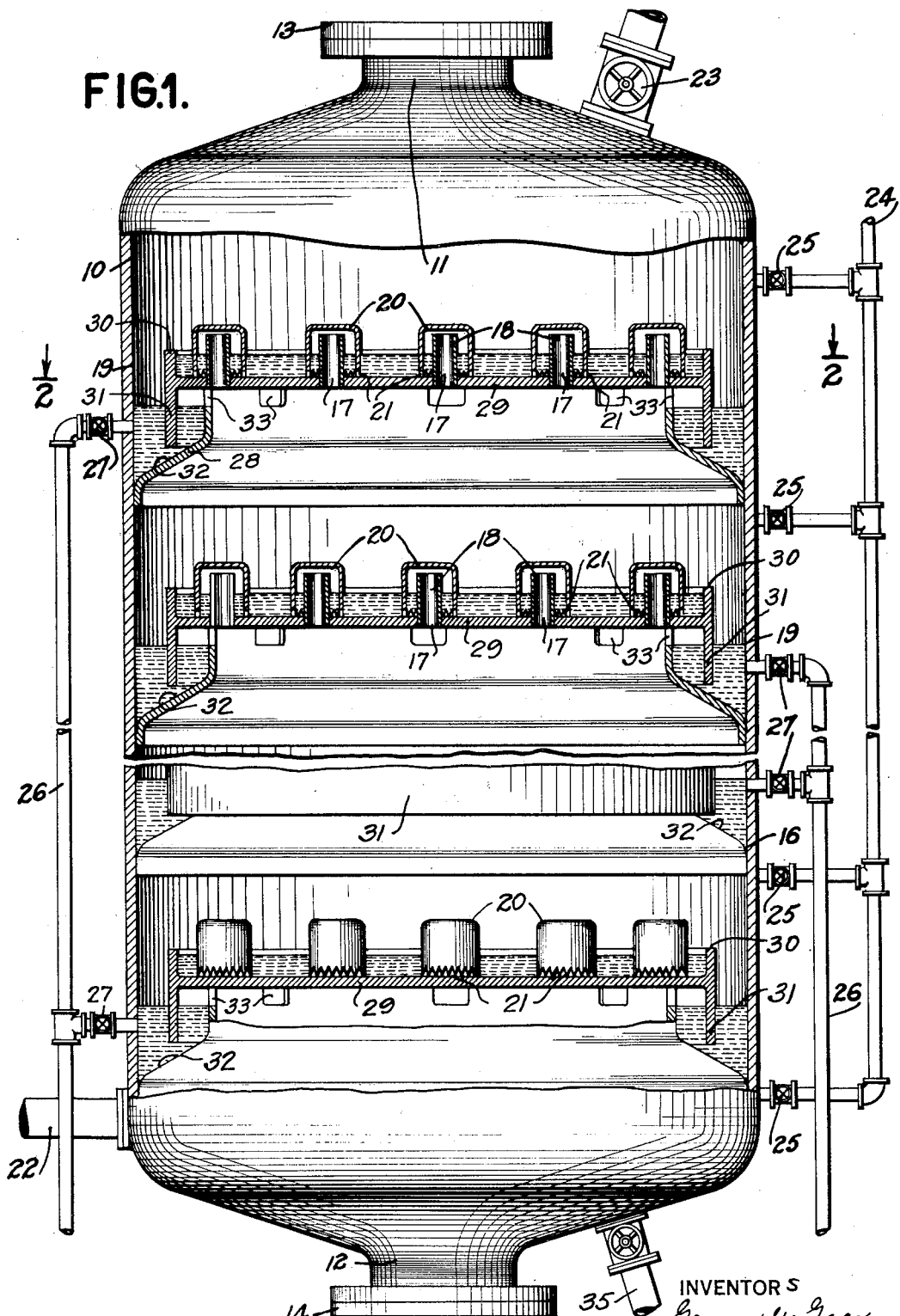

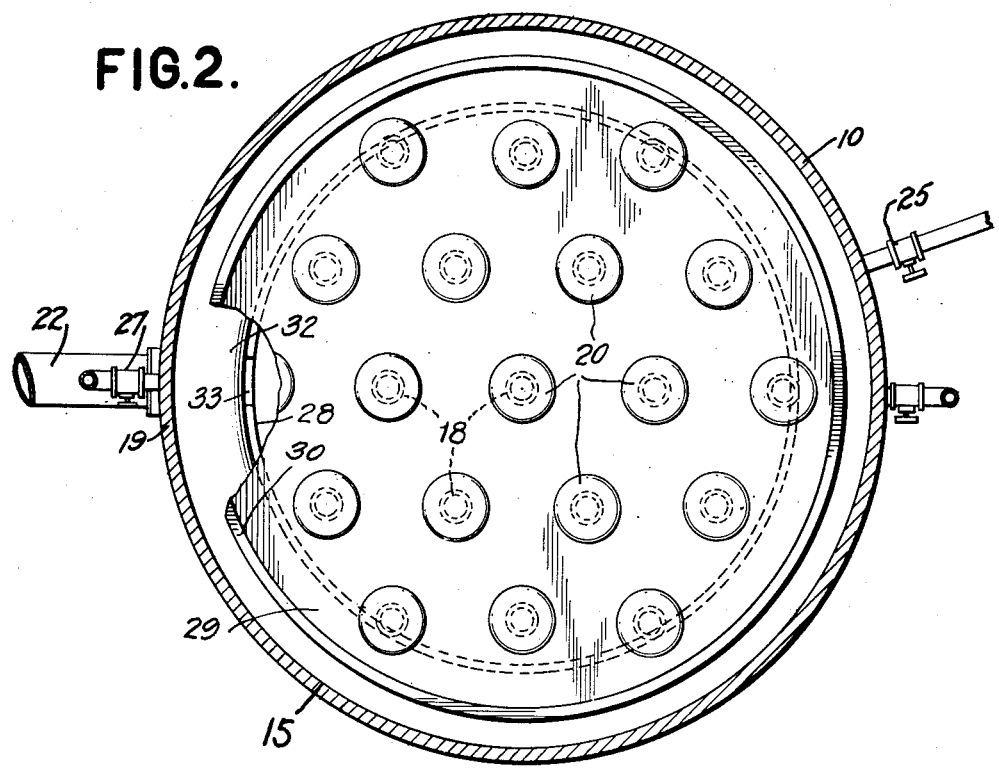

Patented Dec. 12, 1933

1,939,392

UNITED STATES PATENT OFFICE 1,939,392

FRACTIONATING APPARATUS

George W. Gray, New York, N. Y., and Burt E. Hull, Houston, Tex., assignors to The Texas Company, New York, N. Y., a corporation of Delaware Original application September 13, 1922, Serial No. 587,866. Divided and application February 21, 1926, Serial No. 255,889. Again divided and this application June 17, 1930. Serial No. 461,676

2 Claims. (Cl. 261—114)

This application is a division of our pending application Serial No. 255,889, filed February 21, 1928, which in turn was a division of a parent application Serial No. 587,866, filed September 13, 1922.

This invention relates to the treatment of hydrocarbon oils and has particular reference to dephlegmators or fractionating apparatus for effecting condensation, dephlegmation or fractionation of hydrocarbons.

One of the objects of the invention is to provide a fractionating tower that will facilitate the effective contact between the vapors and liquids being treated and at the same time will effectually prevent priming in the tower.

Fractionating equipment may be constructed consisting of a tower containing a plurality of superposed bubble trays each of which is provided with vapor risers with cooperating bubble caps so that the vapors passing upwardly through the tower may be bubbled through the liquid on the trays and with down-flow pipes each of which extends from the liquid level of a given tray down into the liquid on the tray beneath. When the down-flow pipes are thus arranged with the lower ends depending into the liquid on the trays the violent agitation of the liquid on the trays frequently operates to cause a break in the liquid seals which are desired at the lower ends of the pipes so that vapors are permitted to pass up through the down-flow pipes thus preventing or retarding the downward flow of reflux liquid and causing priming of the tower.

Our invention contemplates the provision of down-flow pipes in a bubble tower or other fractionating apparatus adapted and arranged to conduct liquid downwardly through the tower from tray to tray and formed with liquid seals positioned in the spaces between the several trays.

Referring to the drawings:

Figure 1 is a partial sectional elevation of an apparatus constructed in accordance with the invention and constituting an embodiment thereof.

Figure 2 is a sectional plan view of the apparatus taken on the line 2—2 of Figure 1.

The dephlegmator illustrated is in the form of a bubble tower and as shown in Figures 1 and 2 comprises a tank or casing 10 having a manhole 11 at the top and manhole 12 at the bottom, closed respectively by covers or plates 13 and 14, and a plurality of horizontal partitions 29 forming trays or shallow containers. A ring or flange 28 is secured to the walls of the tank or casing 10 so as to form an annular pocket and constitutes a support for the tray 29. This tray has an upturned edge or flange 30 to determine the depth of the liquid therein and a downturned flange 31 which dips into the liquid in the annular pocket 32 within the ring 28. The upper surface of the ring is notched or serrated at 33, to permit the liquid accumulating in the annular pocket, to overflow, onto the tray below.

Each tray or partition is perforated by holes 17, has a plurality of short pipes or nipples 18 to enable vapors to pass upwardly therethrough without permitting leakage of liquid from the trays, except over the flange 30 and caps or bells 20 which cover the ends of the nipples. Each cap has notches 21 at its edges and is deep enough to clear the top of the nipple as shown in Figure 1. The vapors rising from the chamber below are thus permitted to flow through the nipples but are forced to bubble through the liquid in the tray before they escape into the chamber above.

A pipe 22 conducts the vapors to be fractionated from a still (not shown) to the fractionating chamber 10 and a vapor line 23 is provided for removing vapors from the chamber. The vapor line 23 may extend directly to a final condenser such as a condenser coil (not shown) for condensing the vapors removed from the dephlegmator 10. If desired a reflux condenser may be interposed in the line 23 for effecting a condensation of a portion of the vapors passing to the final condenser, and thus form a condensate that may be employed as a reflux or cooling medium for the tower 10. A pipe 24 is shown having a plurality of branches provided with valves 25 and the reflux condensate obtained from the reflux condenser may be introduced to the dephlegmator 10 through the pipe 24 and any or all of its branch lines. If desired, fresh charging stock or fresh charging stock combined with reflux condensate, may be introduced to the dephlegmator 10 through the line 24 and any or all of its branches.

Pipes 26 are provided having valved branch lines extending to the pockets 32 so that liquid may be withdrawn from any or all of the pockets 32. The lower edge of the flange 31 is below the outlet connections to the pipes 26 and consequently the liquid in the pockets always stands above the lower edge of the flange 31 and constitutes a liquid seal so as to prevent the flow of vapors upwardly past the flange. A pipe 35 is provided for withdrawing condensate from the tower.

In practicing the invention with the apparatus illustrated the vapors to be fractionated enter from the still through the vapor line 22 by which they are directed into the lower part of the tower 10. As the vapors rise in the dephlegmator they are forced to bubble through the liquid carried on the trays or partitions of the dephlegmator, thus vaporizing the lighter constituents of the liquid and condensing the heavier constituents of the vapors. Finally the comparatively light vapors which reach the top of the dephlegmator pass out through pipe 23. As the liquid increases on the trays of the dephlegmator it overflows flange 30 into the pockets 32 and may be removed by the pipes 26 and their branches. Each of the pockets is connected to one of the pipes 26 through a valve 27 and consequently any one or all of the pockets may be shut off from pipe 26 and the liquid will in that event overflow and discharge on to the tray below. By having seals in the down-flow pipes positioned in the vapor spaces between the trays instead of in the liquid on the trays priming in the tower is effectually prevented. The lower edge of flange 31 is below the outlet connections to the pipe 26 and consequently even when liquid is being withdrawn through the pipe 26 the liquid in the pocket always stands above the bottom of the flange 31 and constitutes a liquid seal so as to prevent the flow of vapors upwardly therethrough.

The specific apparatus shown in the drawings is particularly well adapted for use under high pressure and may be thus employed for fractionating fluids under pressure, such as the fractionation of vapors evolved from a pressure cracking still. Thus the vapors from the pressure still may be admitted through the pipe 22 and a gasoline fraction taken off to a condenser through the line 23. But the invention may also be applied to the ordinary distillation of hydrocarbons.

Other modifications may be effected within the spirit and scope of our invention, and we desire no limitation other than those imposed by the appended claims.

We claim:

1. In a fractionating tower, a chamber, an annular gutter adjacent the wall of the chamber, a bubble tray formed with a peripheral flange extending upwardly to determine the liquid level on the tray and extending downwardly to depend into the gutter and a pipe connected to said gutter for withdrawing liquid therefrom.

2. A device in accordance with claim 1 wherein the connection of said pipe with said gutter is made at a point above the lower edge of said peripheral flange.

GEORGE W. GRAY.
BURT E. HULL.